(12) United States Patent
Childs et al.

(10) Patent No.: US 6,910,361 B2
(45) Date of Patent: Jun. 28, 2005

(54) COUPLING DEVICE

(75) Inventors: Montgomery W. Childs, Barrie (CA); Malcolm Broadley, Barrie (CA); Ryan Brown, Barrie (CA)

(73) Assignee: Linear Transfer Systems, Ltd., Barrie (CA)

( * ) Notice: Subject to any disclaimer, the term of this patent is extended or adjusted under 35 U.S.C. 154(b) by 71 days.

(21) Appl. No.: 10/133,426

(22) Filed: Apr. 29, 2002

(65) Prior Publication Data

US 2002/0163411 A1 Nov. 7, 2002

(30) Foreign Application Priority Data

May 1, 2001 (CA) .............................................. 2345860

(51) Int. Cl.$^7$ .............................................. B21D 43/05
(52) U.S. Cl. ................................. 72/405.11; 72/405.01; 403/322.2; 403/297
(58) Field of Search ......................... 72/405.01, 405.09, 72/405.11, 405.13; 403/322.2, 322.1, 321, 297, 379.6; 285/81, 82, 276, 403

(56) References Cited

U.S. PATENT DOCUMENTS

| | | | | |
|---|---|---|---|---|
| 3,430,305 A | * | 3/1969 | Geffner | 24/603 |
| 3,667,566 A | * | 6/1972 | Hopkins | 180/89.15 |
| 4,259,052 A | * | 3/1981 | Imanishi et al. | 425/135 |
| 4,648,736 A | * | 3/1987 | Harsch et al. | 403/297 |
| 4,753,102 A | * | 6/1988 | Braun et al. | 30/382 |
| 4,756,639 A | * | 7/1988 | Hoshino | 403/297 |
| 4,823,587 A | * | 4/1989 | Wolfgang et al. | 72/405.13 |
| 4,924,692 A | * | 5/1990 | Rieger et al. | 72/405.13 |
| 6,618,892 B2 | * | 9/2003 | Schmitt | 15/104.33 |
| 6,619,875 B2 | * | 9/2003 | Chiang | 403/322.2 |

FOREIGN PATENT DOCUMENTS

| | | | | | |
|---|---|---|---|---|---|
| DE | 33 00 227 | * | 7/1984 | .............. | 72/405.01 |
| DE | 33 46 737 | * | 4/1985 | .............. | 72/405.09 |
| DE | 237265 | * | 7/1986 | .............. | 72/405.09 |
| DE | 35 20 343 | * | 12/1986 | .............. | 72/405.01 |
| DE | 38 36 170 | * | 4/1990 | .............. | 72/405.09 |
| DE | 41 12 163 | * | 9/1992 | .............. | 72/405.01 |
| DE | 42 23 421 | * | 1/1994 | .............. | 72/405.09 |
| DE | 43 09 237 | * | 9/1994 | | |
| DE | 43 24 619 | * | 1/1995 | .............. | 72/405.13 |
| FR | 2 532 566 | * | 4/1985 | .............. | 72/405.09 |
| JP | 6-47460 | * | 2/1994 | .............. | 72/405.09 |

* cited by examiner

*Primary Examiner*—Daniel C. Crane
(74) *Attorney, Agent, or Firm*—Merek, Blackmon & Voorhees, LLC

(57) ABSTRACT

A coupling device for releaseably securing together two objects. The coupling device comprises a first housing securable to a first object, a second housing securable to a second object, and an actuator secured to the first housing. The second housing has a hollow bore therein. At least part of the actuator is releaseably receivable within the hollow bore of the second housing. The actuator has an activated and a deactivated configuration. When in its activated configuration at least a portion of the periphery of the actuator is in an expanded state such that when situated within the hollow bore of the second housing the expanded periphery of the actuator releaseably secures the first housing to the second housing. When the actuator is in its deactivated configuration the periphery of the actuator in a retracted state permitting separation and relative movement between the first and second housings. The actuator and the first and second housings receive and dissipate bending moments applied thereto across the first and second objects to resist flexure therebetween.

11 Claims, 6 Drawing Sheets

COUPLING DEVICE

This application claims priority from Canadian Patent Application 2,345,860 filed May 1, 2001.

FIELD OF THE INVENTION

This invention relates to coupling devices, and in one embodiment hydraulic couplings that may be used to releaseably secure together adjacent ends of transfer rails in a press transfer system.

BACKGROUND OF THE INVENTION

The manufacturing industry, and in particular the metal fabrication and stamping industries, commonly utilize automated systems that allow a workpiece to be conveyed or transferred between equally spaced workstations where particular operations are carried out upon the workpiece. For example, many metal parts on automobiles and appliances are formed by means of a stamping procedure wherein a series of separate dies are situated on a series of aligned and equally spaced workstations within a press bed such that a workpiece will be stamped between a pair of dies upon each stroke of the press. Automated transfer systems are typically employed to grasp the workpiece, remove it from one set of dies, and transport it laterally through the press bed to the next adjacent workstation where the workpiece will be stamped a second time with a further set of dies upon the next stroke of the press.

A press transfer system utilized in conjunction with a typical multi-stage press would commonly include at least one transversely oriented transfer rail situated adjacent to the press bed and aligned with the various workstations. Depending upon the particular application and press design, a single transfer rail may be positioned along one side of the press bed or, alternatively, a separate transfer rail may be located on each side of the bed of the press. Regardless, the primary function of the transfer rail is to provide a mechanism by which grippers or fingers may be supported adjacent to the workstations for grasping a workpiece so that it may be transported to the next workstation. Such grippers or fingers would typically be mounted either to the transfer rail or to a secondary rail that is in some manner secured or attached to the transfer rail. Movement of the workpieces from workstation to workstation accordingly involves the movement of the transfer rail, often in a relatively complex three dimensional manner. Described generally, this movement involves (i) moving the rail toward the workstation such that the grippers may grasp the workpiece; (ii) lifting upwardly to remove the workpiece from the dies in the workstation; (iii) moving laterally and parallel to the press bed to align the workpiece with the next adjacent workstation; (iv) lowering to allow the grippers to release the workpiece onto the next adjacent set of dies; and, (v) retracting from the workstation and returning back to the starting position.

It will therefore be appreciated that to present an effective mechanism by which a workpiece may be moved in the above-described fashion, the transfer rails must be relatively rigid, must be of a sufficient strength to support workpieces without significant flexure or deflection from the horizontal, and preferably of a relatively light weight construction so as to minimize the inertia of the moving transfer rails to permit more precise and faster movement of workpieces between workstations.

It is common in metal fabrication and stamping facilities for one press to be used in the manufacturing of a variety of different components. Changing the set up of a press to enable the stamping of different components usually necessitates the removal and change-out of the dies. It may also be necessary for the press operator to change or modify the grippers or fingers to accommodate a new workpiece. Changing the dies within the press bed typically requires the transfer rails to be removed from the transfer system to allow for complete and open access to the dies. In addition, changing grippers or fingers to accommodate a new size and shape of workpiece often requires the transfer rails be removed so that new grippers or fingers can be mounted thereon, or that a new transfer rail be installed that has already been pre-fitted with the necessary grippers. In either instance the physical removal of the transfer rail can be a laborious and time consuming procedure adding expense to the manufacturing process by way of increased operator time and by increasing the down time of the press.

To address the need to be able to easily and quickly remove transfer rails to gain access to the press bed, and to facilitate the change-out of grippers or fingers, others have manufactured transfer rails in a series of separate longitudinal sections fastened together at their ends to form a single elongate rail. Consecutive sections of the rail are typically fastened together through the use of bolts, plates or a variety of externally mounted mechanical, pneumatic or hydraulic latches and/or catches. Unfortunately, such transfer rails have generally met with limited success as the systems utilized to fasten rail sections together end to end have tended to be either no more convenient than simply removing the entire rail, or mechanically complex thereby making them more costly and more prone to failure. Furthermore, such prior connecting systems have tended to present a weakness in the structural integrity of the rail at the juncture of adjacent sections. To combat the potential weakness at the location where successive rails are connected, others have reverted to the use of bulky, heavy, high strength components that are capable of transferring load between rail sections without significant deflection or sag. Such components are typically undesirable on account of the increased weight that they add to the transfer rail.

SUMMARY OF THE INVENTION

The invention therefore provides a coupling device that may be used to releaseably secure together two objects, such as two sections of a transfer rail utilized in a linear transfer system. The invention provides such a coupling device that is mechanically efficient, that operates quickly and without significant operator intervention, that is structurally sound to provide a mechanism that readily transfers load between adjacent parts, and that is of a relatively light weight.

Accordingly, in one of its aspects the invention provides a coupling device for releaseably securing together two objects, the coupling device comprising a first housing securable to a first object; a second housing securable to a second object, said second housing having a hollow bore therein; and, an actuator secured to said first housing, at least part of said actuator releaseably receivable within said hollow bore of said second housing, said actuator having an activated and a deactivated configuration, when in said activated configuration at least a portion of the periphery of said actuator in an expanded state such that when situated within said hollow bore of said second housing said expanded periphery of said actuator releaseably securing said first housing to said second housing, when said actuator in said deactivated configuration the periphery of said actuator in a retracted state permitting separation and relative movement between said first housing and said second housing, said actuator and said first and second housings receiving and dissipating bending moments applied thereto across the first and second objects to resist flexure therebetween.

In a further aspect the invention provides a coupling device for releaseably securing together two objects, the coupling device comprising a first housing securable to a first object, one end of said first housing having an elongate load transferring member receivable within the first object, the opposite end of said housing having and elongate spigot; a second housing securable to a second object, said second housing including an elongate load transferring member receivable within the second object, said elongate load transferring member having a hollow bore therein for receiving said elongate spigot of said first housing; and, an expandable locking member for releaseably securing said spigot within said hollow bore of said second housing, when said expandable locking member securing said spigot within said hollow bore of said second housing said spigot and said elongate load transferring members of said first and second housings dissipating bending moments across the first and second objects and resisting flexure therebetween.

In yet a further aspect the invention provides a coupling device for releasably securing together the ends of a first and a second longitudinal rail, one end of the second rail having a hollow bore formed therein, the coupling device comprising a first housing securable to the end of the first rail, one end of said first housing having an elongate load transferring member securable to the first rail and the opposite end of said housing having an elongate spigot, said spigot of a size and shape such that said spigot is closely receivable within the hollow bore in the end of the second longitudinal rail; and, an activator that upon activation causes at least a portion of the periphery of said spigot to expand such that when said spigot is received within the hollow bore in the end of the second rail said spigot releaseably secures the ends of the first and second rails together, said spigot and said elongate load transferring member receiving and accommodating bending moments resulting from loads applied to the first and second rails and dissipating bending moments across the first and second rails to resist flexure therebetween.

The invention also provides a coupling device for securing together the ends of segments of a transfer rail for use in a press transfer system, the coupling device comprising a first housing securable to one end of a first segment of the transfer rail, said first housing having on one end an elongate load transferring member securable to one segment of the transfer rail, the opposite end of said first housing having an elongate spigot; a second housing securable to one end of a second segment of the transfer rail, said second housing including an elongate load transferring member receivable within a bore in the end of the second segment of the transfer rail, said elongate load transferring member of said second housing having a hollow bore therein for receiving said elongate spigot of said first housing such that when said spigot is received within the hollow bore in said second housing said spigot releaseably secures the ends of the first and second segments of the transfer rail together, said spigot and said elongate load transferring members of said first and said second housings receiving and dissipating bending moments applied thereto across the first and second segments of the transfer rail and resisting flexure therebetween.

Further advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
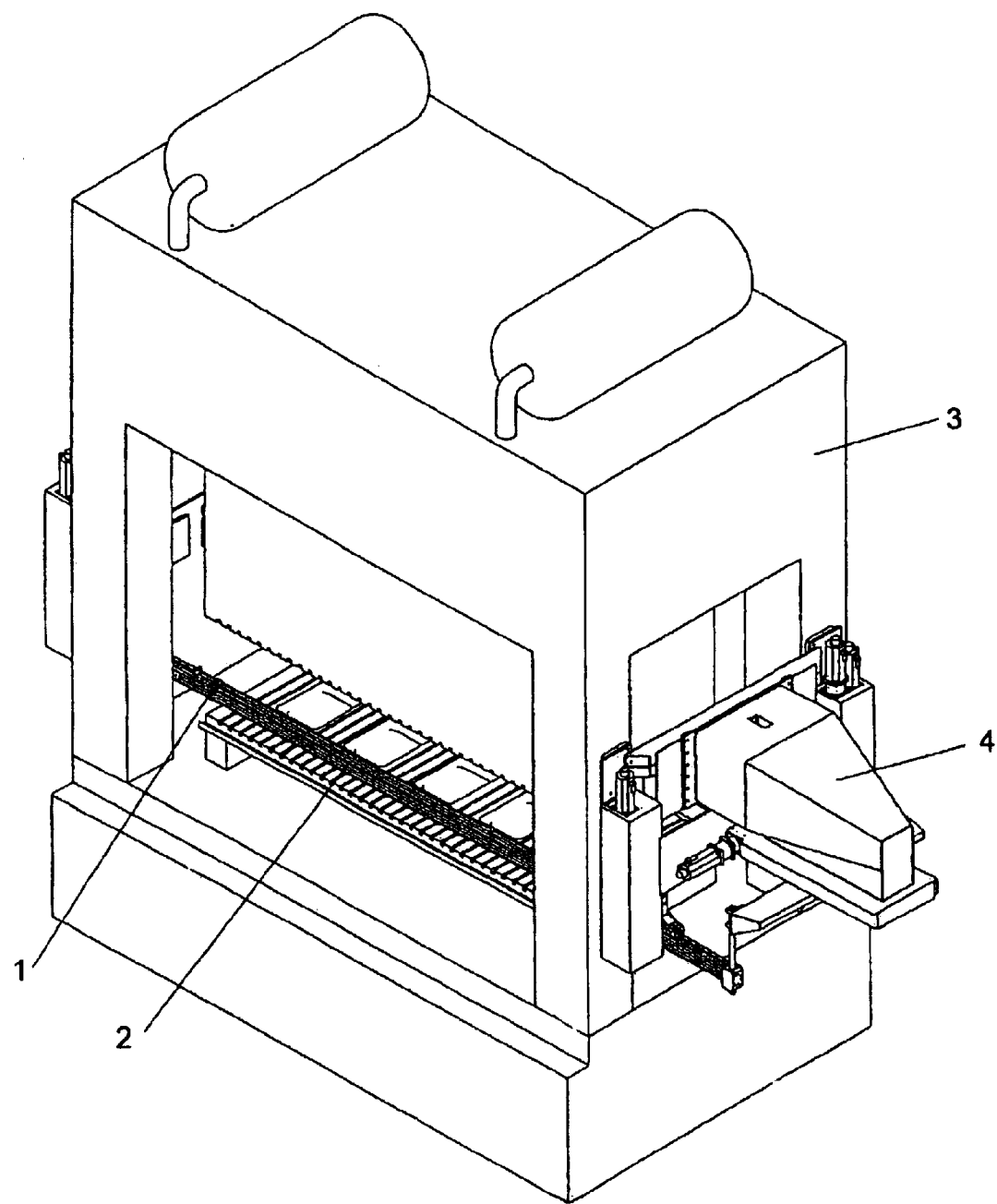
FIG. 1 is an upper side perspective view of a press having mounted thereon a transfer system employing a coupling device in accordance with a preferred embodiment of the present invention.

The present invention may be embodied in a number of different forms. However, the specification and drawings that follow describe and disclose only some of the specific forms of the invention and are not intended to limit the scope of the invention as defined in the claims that follow herein.

The coupling device in accordance with a preferred embodiment of the present invention is noted generally in the attached drawings by reference numeral 1. While it will be appreciated that coupling device 1 may be utilized to secure together a variety of different objects, for illustration purposes in the attached drawings coupling device 1 has been shown as it would typically be used to secure together the ends of two sections of a transfer rail 2.

Figure 2:
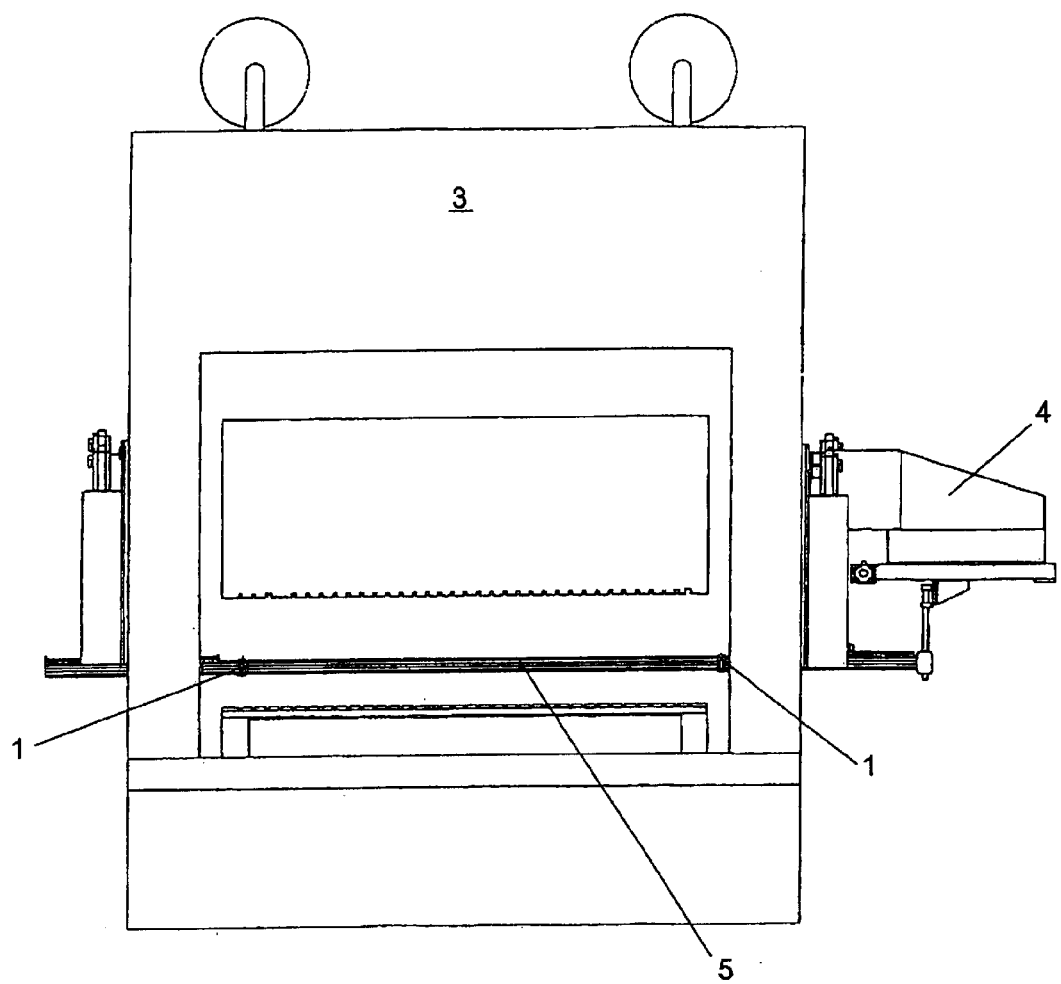
FIG. 2 is a side elevational view of the press shown in FIG. 1.
Figure 3:
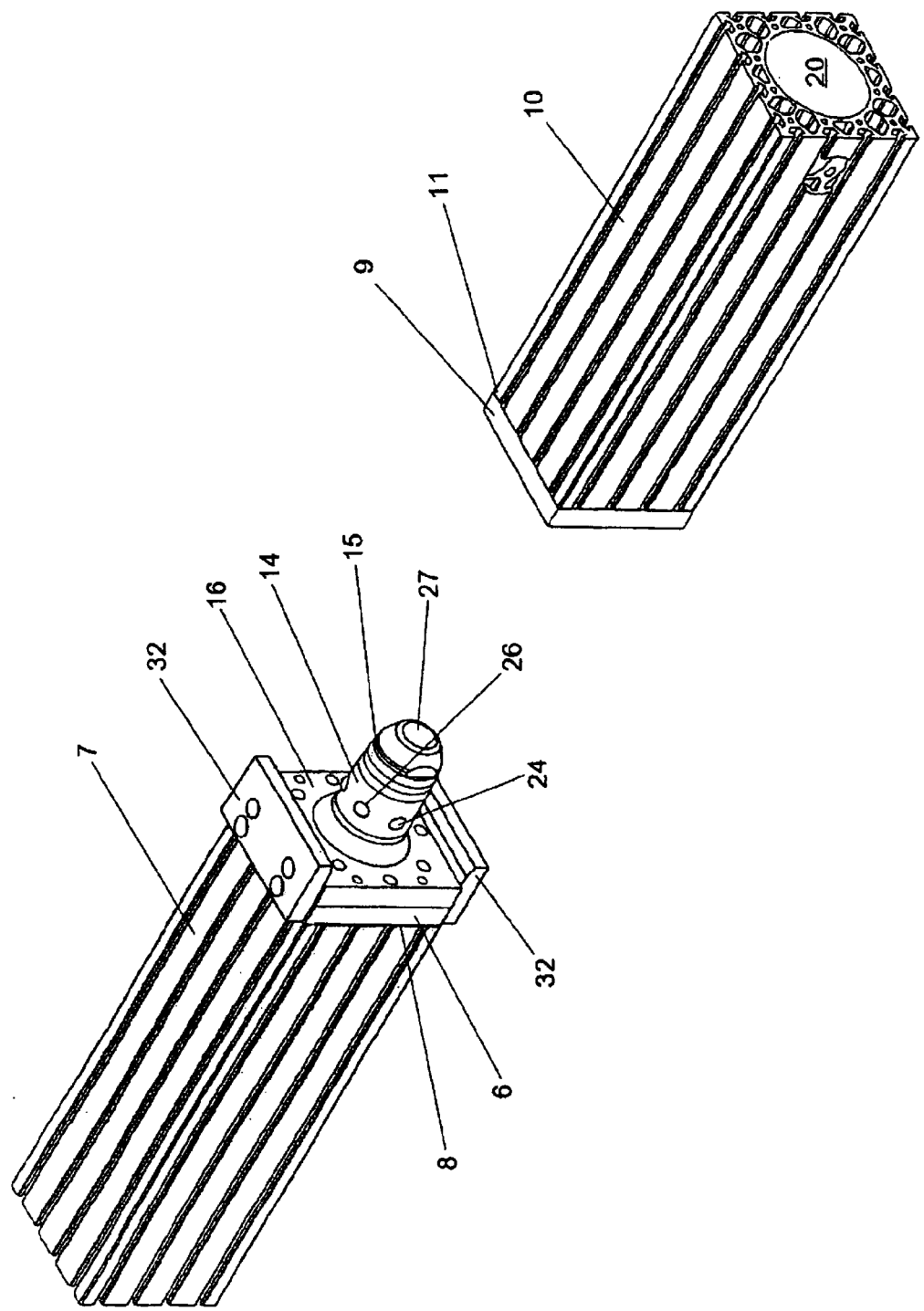
FIG. 3 is an upper right side perspective view of two sections of a transfer rail that utilizes a coupling device in accordance with a preferred embodiment of the present invention wherein the sections of transfer rail are in a decoupled configuration.
Figure 4:
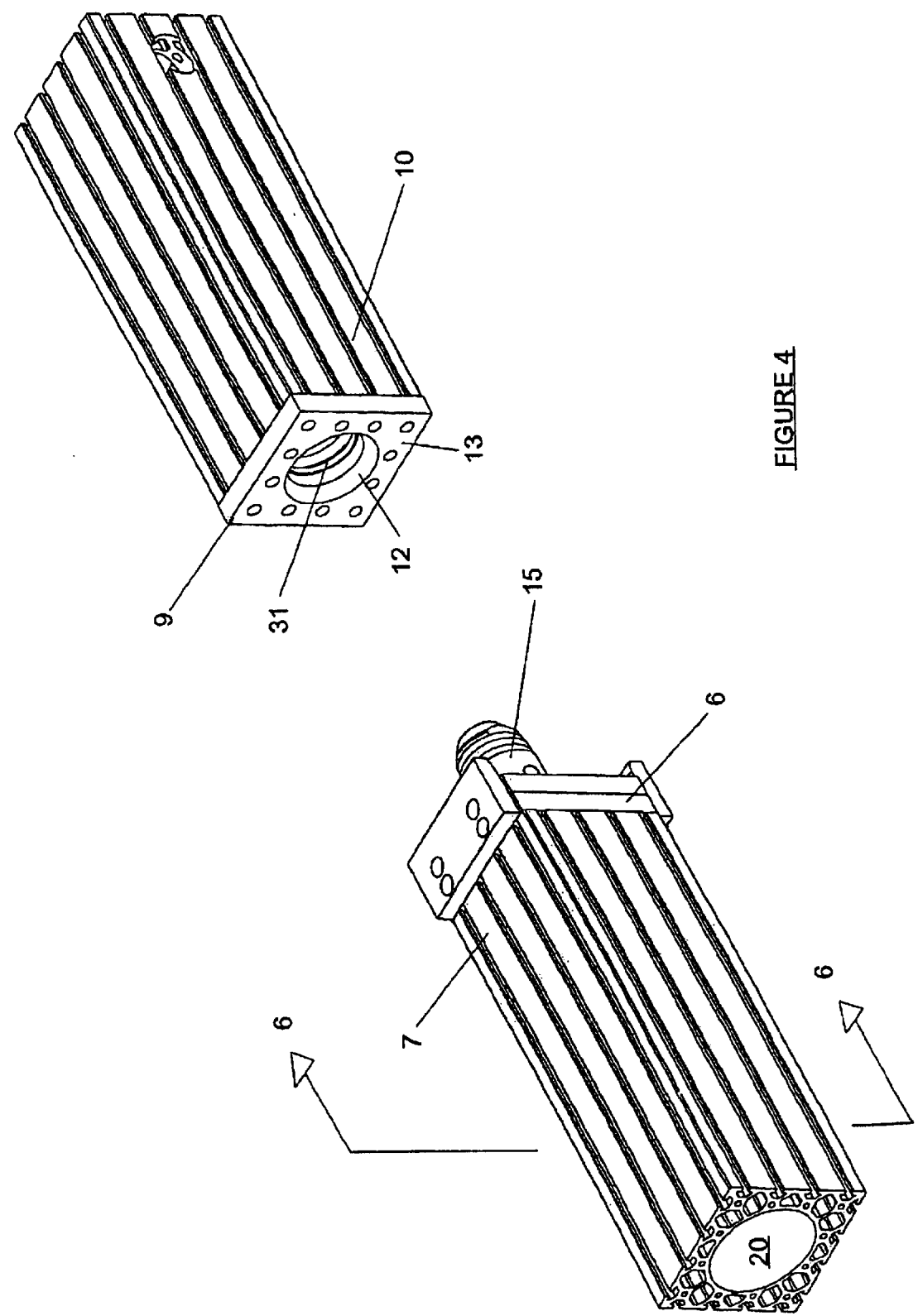
FIG. 4 is an upper left side perspective view of the sections of the transfer rail shown in FIG. 3.

FIGS. 1 and 2 generally depict a press 3 having mounted thereon a linear transfer system 4 that utilizes a pair of transfer rails 2 (only one of which is shown in the drawings) in order to assist in the movement of workpieces between adjacent workstations within the press bed. As shown specifically in FIG. 2, where coupling device 1 is used to secure together the ends of adjacent transfer rails for use in a press transfer system, typically two such coupling devices would be incorporated into the transfer rail such that the middle portion 5 of the rail can be easily and quickly decoupled to allow for the change-out of the dies, or for the adjustment or changing of the grippers or fingers which engage the workpieces. As will be appreciated from a complete understanding of the present invention, where coupling device 1 is hydraulically or pneumatically operated, a supply of pressurized hydraulic fluid or air would typically be provided to the coupling device from an exterior source either positioned or attached to press 3, or from a centralized source located elsewhere within the manufacturing facility.

Referring now to FIGS. 3 through 6, there is shown therein one preferred embodiment of the present invention. In this embodiment coupling device 1 comprises a first housing 6 that is securable to an object, that in this instance comprises the end 8 of a section of transfer rail 7. Typically end 8 of transfer rail 7 would have incorporated into it a series of threaded bores that enable first housing 6 to be secured thereto by means of bolts or threaded studs. Coupling device 1 further includes a second housing 9 securable to a second object, that in this instance comprises a second section 10 of a transfer rail. Once again second housing 9 would typically be secured to transfer rail 10 through the use of bolts or threaded studs received within threaded bores in end 11 of section 10. Second housing 9 includes a hollow bore 12 therein that is preferably positioned centrally upon the outer face 13 of the housing.

Figure 5:
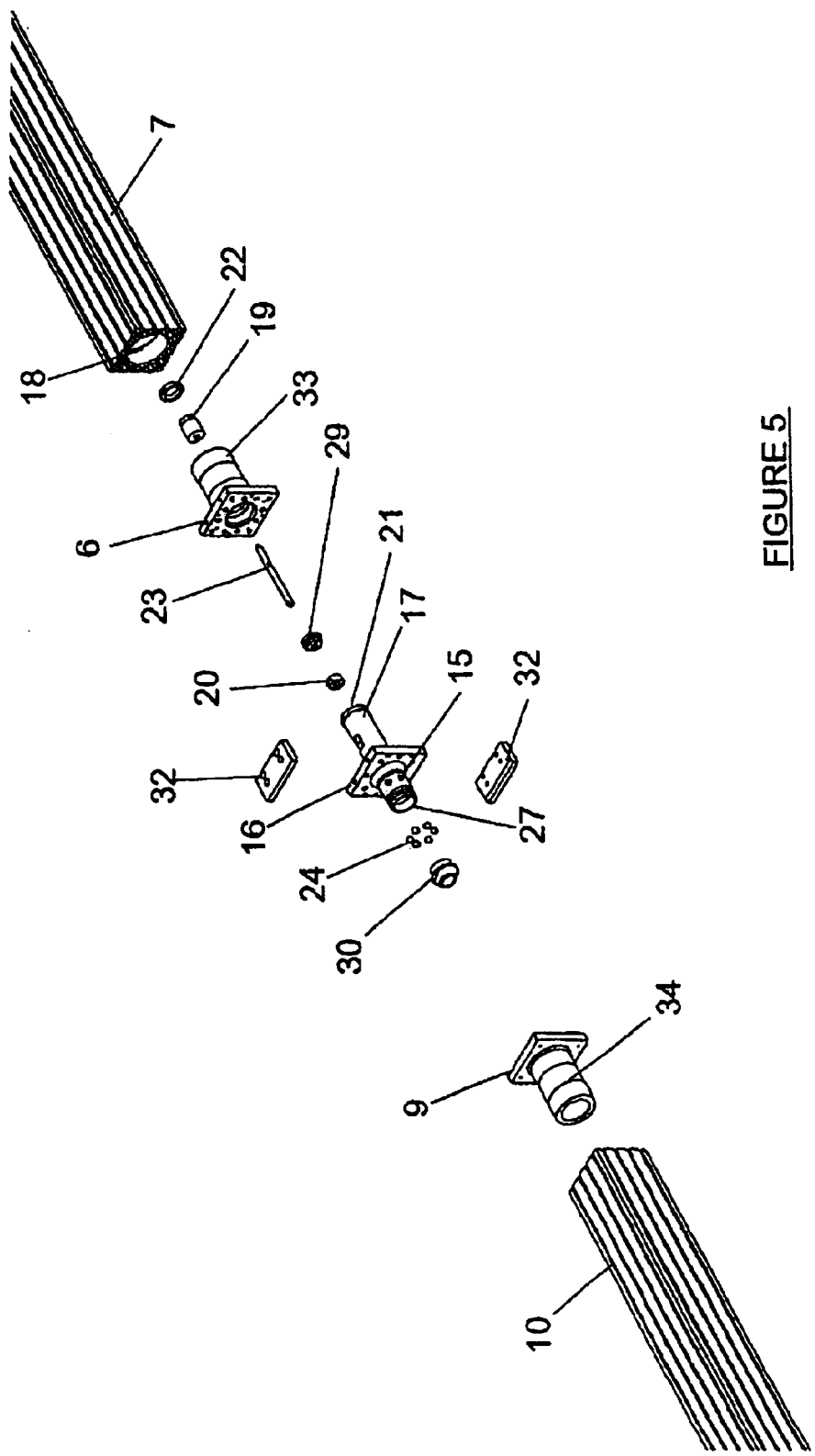
FIG. 5 is an upper side perspective view of a coupling device in accordance with a preferred embodiment of the invention shown in an exploded configuration; and, FIG. 6 is a sectional view taken along the line 6—6 in FIG. 4.

As shown best in FIG. 5, in a preferred embodiment housings 6 and 9 each include an elongate load transferring member 33 and 34, respectively. Load transferring members 33 and 34 are closely received within correspondingly shaped bores in the ends of rail sections 7 and 10, with the exterior surfaces of the load transferring members in contact with the internal surfaces of the bores into which they are received. To enhance the contact between load transferring members 33 and 34 and the bores in rail sections 7 and 10 the load transferring members may be dimensioned so that they are press fit into the bores. Through the use of load transferring members 33 and 34, and through their close fit within the bores in the ends of rail sections 7 and 10, it will be appreciated that bending moments and loads received by housings 6 and 9 will be dissipated over an enhanced portion of rail sections 7 and 10 than would be the case if first housing 6 and second housing 9 were merely bolted onto the ends of the rail sections.

Coupling device 1 further includes an actuator that is noted generally in the attached figures by reference numeral 14. Actuator 14 is secured to first housing 6 with at least a part of the actuator releaseably receivable within hollow bore 12 of second housing 9. The operation of actuator 14 (which will be described in more detail below) is such that when first housing 6 is pushed against second housing 9 actuator 14 is received within bore 12 of the second housing. Thereafter, activation of actuator 14 causes at least a portion of the periphery of the actuator to expand thereby securing the first housing to the second housing. Similarly, when the actuator is deactivated the portion of the periphery of the actuator that was expanded is allowed to retract permitting first housing 6 to be separated from second housing 2, and also permitting relative movement between the respective housings.

The structure and operation of actuator 14 will now be described in further detail. As shown in the attached Figures, actuator 14 preferably includes a generally hollow elongate spigot 15 that constitutes the portion of the actuator that is releaseably receivable within hollow bore 12 of second housing 9. Spigot 15 is preferably dimensioned so as to closely fit within bore 12 so that any bending moments applied to, or borne by, the spigot will be transmitted to housing 9 with either no, or only minimal, movement of the spigot relative to housing 9. The elongate nature of spigot 15 helps to dissipate loads borne by the spigot to housing 9 and to load transferring member 34.

To facilitate in the assembly of the internal components of actuator 14, in one embodiment of the invention the outer end 27 of spigot 15 comprises a cap or plug 30 that is received and threaded over the end of the spigot. Spigot 15 would typically be mounted upon a cylinder housing 16 that is fixed to first housing 6 by means of a plurality of bolts or threaded studs. Cylinder housing 16 would typically include a hollow, general cylindrical, chamber 17 opposite spigot 15. When cylinder housing 16 is secured to first housing 6 chamber 17 will be received within a hollow bore 18 extending through the first housing 6. The internal diameter of chamber 17 is such that it helps control movement of the internal parts of actuator 14, as will also be discussed in more detail below. However, it will be appreciated by those skilled in the art that in an alternate embodiment hollow bore 18 within first housing 6 may be constructed and machined to acceptable tolerances such that the utilization of chamber 17 may not be necessary.

In a preferred embodiment of the invention the primary mode of activating and deactivating coupling device 1 (and specifically actuator 14) is through the use of an activator that would typically be in the form of a fluid activated cylinder 19. Cylinder 19 is preferably received within chamber 17 of first housing 6 and connected to a source of pressurized hydraulic fluid or gas through hoses or conduits (not shown) running through the generally hollow interior 20 of transfer rail 7. Cylinder 19 has an engaged and a disengaged position such that when the cylinder is in its engaged position actuator 14 is in its activated configuration with at least a portion of its periphery in an expanded state. Similarly, when cylinder 19 is in its disengaged position actuator 14 is in its deactivated configuration and in a retracted or non-expanded state.

In the embodiment shown in the attached drawings, cylinder 19 is a double acting cylinder such that alternate pressurization of its internal chambers causes activation or deactivation of actuator 14. However, it will be appreciated by those skilled in the art that a single action cylinder may equally be used in conjunction with a spring mechanism designed to return the cylinder to its disengaged position. Alternatively, a pair of one acting cylinders could be used in place of a single double acting cylinder. It will also be appreciated that the activator cold be an electric solenoid used in place of cylinder 19.

Figure 6:
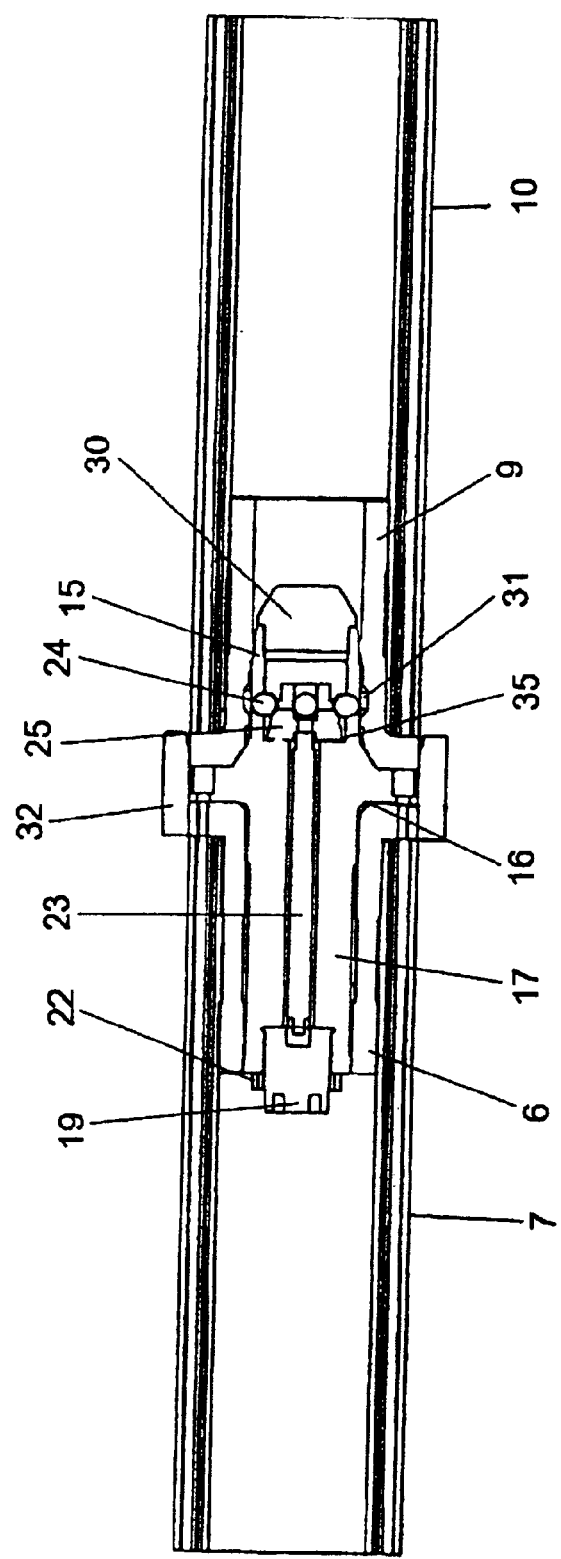

As shown in FIGS. 5 and 6, cylinder 19 is secured in place at the rearward end 21 of chamber 17 by means of a lock on jam nut 22. Connected to the opposite end of cylinder 19 and attached to its internal piston is a piston rod 23. With the generally hollow interior of spigot 15 aligned with the interior of chamber 17, when piston rod 23 is attached to cylinder 19 it will extend through chamber 17 and into the hollow interior of spigot 15.

The expansion and retraction of at least a portion of the periphery of actuator 14 to allow the actuator to secure first housing 6 to second housing 9 is accomplished through an expandable locking member that is comprised generally of plurality of balls 24 and a wedge 25, both of which are positioned within the hollow interior of spigot 15. Spigot 15 includes a plurality of openings or holes 26 through its outer surface that are in communication with its hollow interior. Openings 26 are of a shape corresponding to balls 24 but have a smaller diameter so as to prevent the complete passage of the balls therethrough. Accordingly, when balls 24 are aligned with openings 26 and pushed outwardly from the interior of spigot 15 they will extend partially through the openings but will not completely escape the interior of the spigot. Movement of the balls in this fashion is accomplished by means of wedge 25 which is secured to the end of piston rod 23.

Movement of the piston rod longitudinally through chamber 17 and the interior of spigot 15 by cycling cylinder 19 between its engaged and disengaged positions causes piston rod 23 to drive wedge 25, in one case toward the outer most end 27 of spigot 15, and in the other case away from end 27. As wedge 25 is driven toward the end of 27 of spigot 15 a ramped exterior portion 29 contacts and engages balls 24 causing the balls to be pushed outwardly through openings 26. The rearward end 35 of ramped portion 29 is of a generally cylindrical configuration such that as the wedge is driven toward end 27 of spigot 15 ramped portion 29 will push balls 24 into openings 26, after which cylindrical portion 35 will maintain balls 24 in position extending partially through openings 26. The diameter of cylindrical portion 35 will accordingly be generally the same as the outer diameter of sloped or ramped portion of the wedge. Once in contact with cylindrical portion 35, there will be no tendency for balls 24 to place a load upon cylinder 19, as would be the case if they were bearing directly upon the sloped ramped surface of the wedge. In addition, with balls 24 bearing against cylindrical portion 35 the balls will remain in position in the event of a loss of fluid pressure to cylinder 19, thereby maintaining the integrity of the connection between spigot 15 and housing 9.

Retracting piston rod 23 away from outer end 27 of spigot 15 by disengaging cylinder 19 retracts wedge 25 from balls 24 allowing the balls to be received back within the hollow interior of the spigot. A constant diameter outer portion 28 of wedge 25, having a smaller diameter than ramped portion 29, will remain in contact with balls 24 upon the retraction of piston rod 23 so as to allow the balls to retract back into the hollow interior of the spigot but to retain them adjacent to openings 26 and prevent them from becoming misaligned or lost within the hollow interior of the spigot. In the embodiment shown in FIG. 5, the ramped portion 29 and the constant diameter portion 28 of wedge 25 are shown as two separate parts. Forming portions 28 and 29 as two separate parts helps to facilitate the assembly of actuator 14, and specifically the insertion and placement of balls 24 within the spigot. However, it will be appreciated that if desired a single part having the attributes of both ramped portion 29 and constant diameter portion 28 could be utilized.

In order to assist in the securement of spigot 15 within hollow bore 12 of second housing 9, the second housing preferably includes an internal circumferential race 31 positioned about its interior surface. Race 31 is of a size and configuration to receive the portion of balls 24 that are forced through openings 26 by wedge 25. Race 31 is also located along the internal wall of bore 12 at a location such that it will align with balls 24 when the spigot is received within hollow bore 12. In this manner, when wedge 25 causes balls 24 to extend through openings 26 with spigot 15 received within hollow bore 12, the balls will be received within race 31 thereby securely holding spigot 15 within hollow bore 12 and securing first housing 6 to second housing 9. Retraction of wedge 25 will allow balls 24 to also retract back through openings 26, thereby releasing the balls from race 31 and allowing the spigot to be removed from hollow bore 12.

It will be appreciated that when secured together in the manner as described above, spigot 15 and hollow bore 12 will prevent separation of first housing 6 from second housing 9 and thereby provide a means to secure two objects together. However, where the spigot and hollow bore are cylindrical their structures will not be conducive to preventing rotational movement between the two objects secured together. For that reason, to prevent rotation of first housing 6 relative to second housing 9 when so secured together, in one preferred embodiment of the invention coupling device 1 includes at least one anti-rotation member. In the attached drawings, two anti-rotation members are shown in the form of plates 32. Plates 32 are preferably positioned on opposite sides of transfer rail 2 and span the outer surfaces of first housing 6 and second housing 9 when the housings are secured together. In this way plates 32 will prevent relative rotation between the housings, and between adjacent sections of the transfer rail. In an alternate embodiment the anti-rotation members may be comprised of one or more torque pins or torque plates extending outwardly from the face of either first housing 6 or second housing 9 and received within correspondingly shaped recesses within the face of the opposite housing.

It will therefore be appreciated and understood from a thorough understanding of the present invention that coupling device 1 provides a mechanism that is mechanically efficient, may be operated quickly and without significant operator intervention, and that is of a relatively light weight. Coupling device 1 also has the ability to transfer loads between objects which it connects together in a manner that resists flexure therebetween. That is, through manufacturing spigot 15 and internal bore 12 under relatively tight tolerance constraints, and through the receipt of a portion of balls 24 within internal circumferential race 31 within hollow bore 12, a coupling structure is created that is capable of distributing bending moments that may be applied thereto while resisting deflection or sag. Where the objects to be coupled together are transfer rails for use in a press transfer system, horizontal alignment is critical in order to ensure the proper positioning of grippers or fingers to move workpieces through successive workstations within the press bed. Misalignment of connected transfer rail sections while under load can result in the improper grasping of workpieces and the failure to position workpieces properly upon the dies and the workstation. If the misalignment is significant enough, workpieces could be improperly pressed and finger or gripper members could be destroyed during the stamping operation. The structure of the above described invention helps to prevent such occurrences.

The ability of coupling device 1 to receive and dissipate bending moments that may be applied to rail sections 7 and 10 is also enhanced through the use of load transferring members 33 and 34. As described above, with load transferring members 33 and 34 closely received within bores in the ends of rail sections 7 and 10, loads received by housings 6 and 9 are dissipated over a greater area of the two segments of the transfer rail. This structure presents a more rigid connection between the respective sections of the transfer rail and increases the ability for coupling device 1 to accept bending moments. The described structure also provides a "tight" connection that is less likely to "work" itself loose during operation. Both of these attributes are particularly important in the context of a transfer rail used in a press transfer system. Such rails are typically formed from a light weight, hollow, aluminum extrusion. Being able to dissipate bending moments over an enhanced area of such extrusions is advantageous in terms of preventing flexing and sag.

It is to be understood that what has been described are the preferred embodiments of the invention and that it may be possible to make variations to these embodiments while staying within the broad scope of the invention. Some of these variations have been discussed while others will be readily apparent to those skilled in the art. For example, while in the above described embodiment first and second housings are secured to the objects sought to be coupled together, the objects themselves could be machined such that one object includes a spigot that is receivable within a hollow bore machined into a second object.

What is claimed is:

1. A coupling device for releasably securing together the ends of a first and a second longitudinal rail, one end of the second rail having a hollow bore formed therein, the coupling device comprising:

a first housing securable to the end of the first rail, one end of said first housing having an elongate load transferring member securable to the first rail and the opposite end of said housing having an elongate spigot, said spigot of a size and shape such that said spigot is closely receivable within the hollow bore in the end of the second longitudinal rail; and, an activator that upon activation causes at least a portion of the periphery of said spigot to expand such that when said spigot is received within the hollow bore in the end of the second rail said spigot releasably secures the ends of the first and second rails together, said spigot and said elongate load transferring member receiving and accommodating bending moments resulting from loads applied to the first and second rails and dissipating bending moments across the first and second rails to resist flexure therebetween, said spigot having a generally hollow interior and including a plurality of balls partially protruding through openings about the circumference of said spigot, said openings of a shape corresponding to said balls but having a diameter smaller than said balls to prevent the complete passage of said balls therethrough, said spigot further including a wedge positioned within said hollow interior of said spigot, said wedge connected to said activator such that said activator causes said wedge to be driven within said hollow interior of said spigot and into contact with said balls causing said balls to partially extend through said openings about the circumference of said spigot, when said spigot received within said hollow bore of said second rail said partially extending balls received within an interior race in said hollow bore and securing said spigot within said hollow bore.

2. The device as claimed in claim 1, wherein said elongate load transferring member receivable within an internal bore situated within the end of the first rail, said load transferring member dissipating bending moments received thereby across the length of the internal bore that is in contact with said load transferring member.

3. The device as claimed in claim 1 wherein said wedge includes a generally cylindrical portion, when said balls partially extending through said openings about the circumference of said spigot said balls in contact with said cylindrical portion of said wedge.

4. The device as claimed in claim 1 wherein said activator is a fluid actuated double acting hydraulic or pneumatic cylinder.

5. The device as claimed in claim 1 wherein said activator is an electric solenoid.

6. A coupling device for securing together the ends of segments of a transfer rail for use in a press transfer system, the coupling device comprising:

a first housing securable to one end of a first segment of the transfer rail, said first housing having on one end an elongate load transferring member securable to one segment of the transfer rail, the opposite end of said first housing having an elongate spigot;

a second housing securable to one end of a second segment of the transfer rail, said second housing including an elongate load transferring member receivable within a bore in the end of the second segment of the transfer rail, said elongate load transferring member of said second housing having a hollow bore therein for receiving said elongate spigot of said first housing such that when said spigot is received within the hollow bore in said second housing said spigot releasably secures the ends of the first and second segments of the transfer rail together, said spigot and said elongate load transferring members of said first and said second housings receiving and dissipating bending moments applied thereto across the first and second segments of the transfer rail and resisting flexure therebetween, wherein said spigot has a generally hollow interior with a plurality of balls received within said hollow interior, said balls partially protruding through openings about the circumference of said spigot, said openings of a shape corresponding to said balls but having a diameter smaller than said balls to prevent the complete passage of said balls therethrough, said spigot further including a wedge positioned within its hollow interior, said wedge connected to an activator such that operation of said activator causes said wedge to he driven within said hollow interior of said spigot and into contact with said balls causing said balls to partially extend through said openings about the circumference of said spigot, when said spigot received with said hollow bore of said second housing said partially extending balls received within a circumferential race on the inner surface of said hollow bore and securing said spigot therein.

7. The device as claimed in claim 6 wherein said wedge includes a generally cylindrical portion, when said balls partially extending through said openings about the circumference of said spigot said balls in contact with said cylindrical portion of said wedge.

8. The device as claimed in claim 6 wherein said activator is a fluid actuated double acting hydraulic or pneumatic cylinder.

9. The device as claimed in claim 6 wherein said activator is an electric solenoid.

10. The device as claimed in claim 6 including at least one anti-rotation member, upon the receipt of said spigot within said hollow bore of said second housing said anti-rotation member resisting rotation of said first housing relative to said second housing.

11. The device as claimed in claim 6 wherein said elongate load transferring member of said first housing is receivable within a bore within the end of the first segment of the transfer rail, said load transferring member dissipating bending moments received thereby across the length of the internal bore within the end of the first segment of the transfer rail that is in contact with said load transferring member.

* * * * *